June 22, 1943.  A. Y. DODGE  2,322,570
UNIVERSAL JOINT
Filed Dec. 26, 1941  3 Sheets-Sheet 3
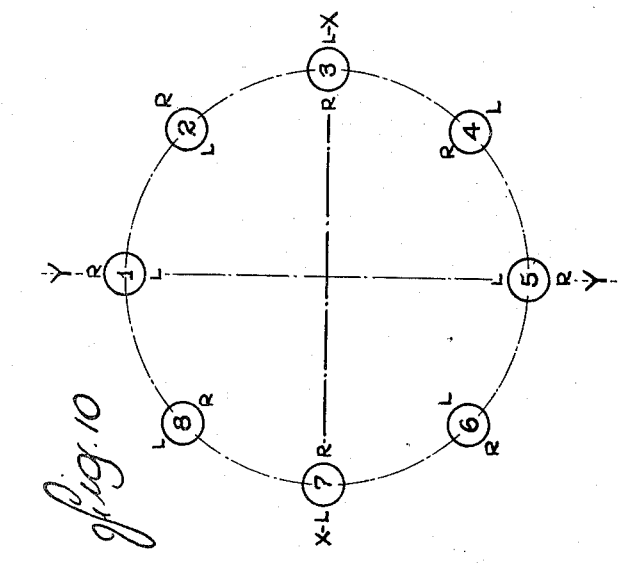
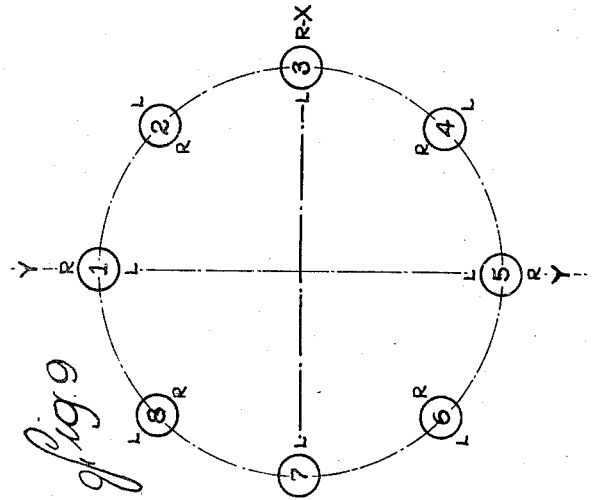
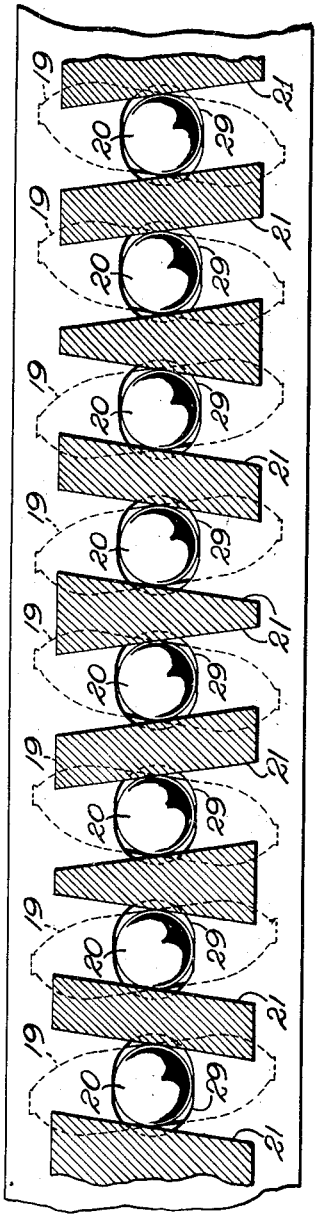
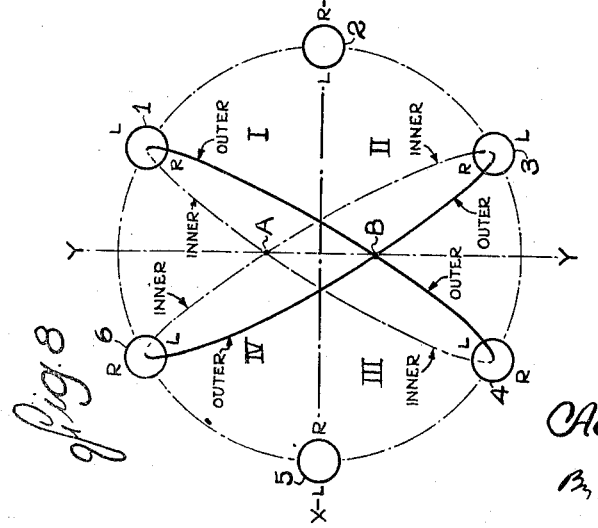
INVENTOR
Adiel Y. Dodge
By Parker, Carlson, Pitzner, Hubbard
ATTORNEYS Patented June 22, 1943

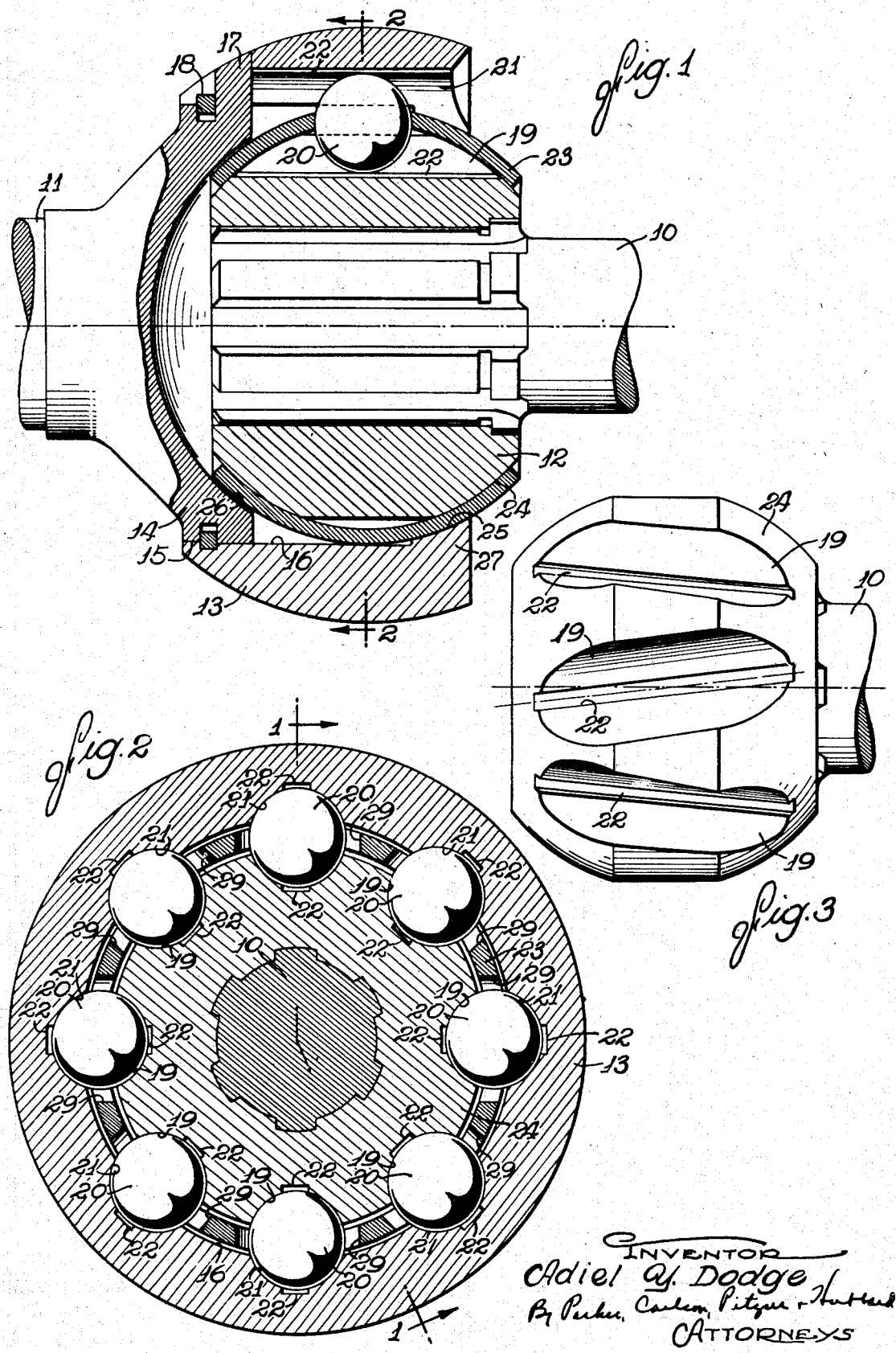

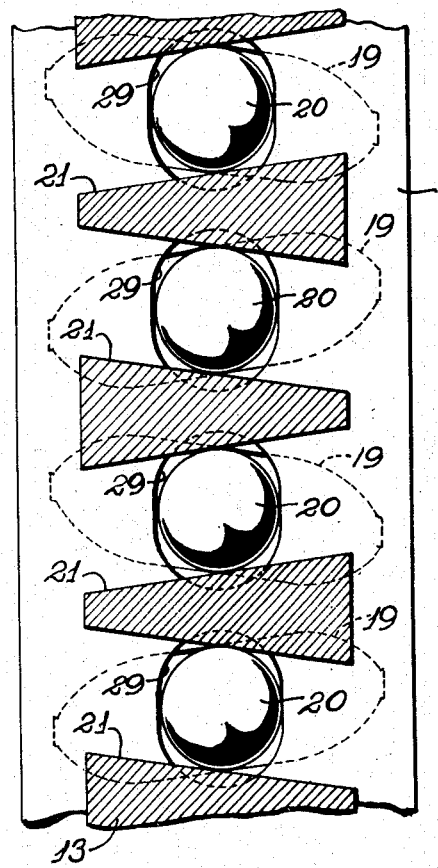
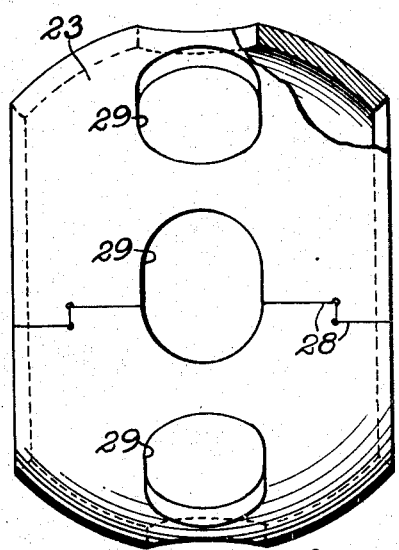
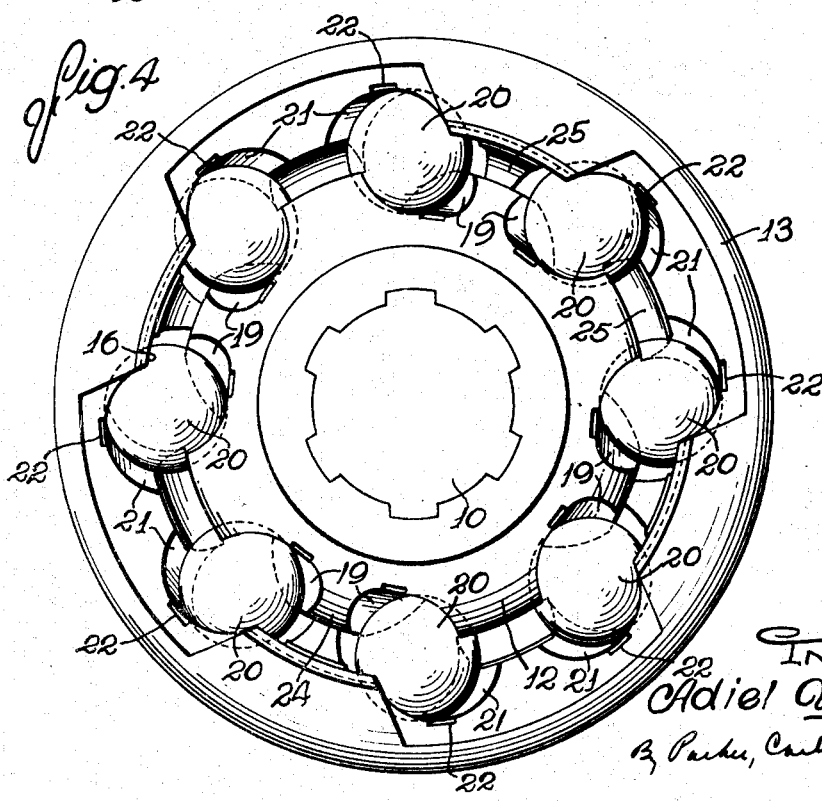

2,322,570

UNITED STATES PATENT OFFICE 2,322,570

UNIVERSAL JOINT

Adiel Y. Dodge, Rockford, Ill.

Application December 26, 1941, Serial No. 424,390

3 Claims. (Cl. 64—21)

This invention relates to constant velocity universal joints of the type in which torque is transmitted through an annular series of balls disposed in crossing raceways on the inner and outer joint elements and embraced by a cage which serves to hold the balls in a plane movable about the point of intersection of the axes of the joint elements.

In joints of this character, it has been proposed to incline the adjacent raceways in each element in opposite directions so that the end thrust incident to the transmission of rotary power through the joint is divided into oppositely directed components which counteract each other. I have discovered that with certain ball arrangements and at the larger joint angles frequently required, such alternation of the raceways results in the loss of control of the cage by the balls or such unbalancing of the forces acting on the cage as to cause locking of the joint. Based on this discovery, the primary aim of the present invention is to provide a joint of the above character which is not subject to locking at comparatively large joint angles and which has optimum torque transmitting capacity for a given size of joint.

A more detailed object is to provide a universal joint of the above general character having the minimum number of balls that will at all operating angles provide for adequate control of the cage by a proper number of balls distributed advantageously around the joint.

The invention also resides in the novel arrangement of the ball raceways.

Other objects and advantages of the invention will become apparent from the following detailed description taken in connection with the accompanying drawings, in which Figure 1 is a longitudinal sectional view of a universal joint embodying the present invention, the section being taken along the line 1—1 of Fig. 2.

Fig. 2 is a section taken along the line 2—2 of Fig. 1.

Fig. 3 is a side view of the inner joint element.

Fig. 4 is an end view of the joint with the cage omitted.

Fig. 5 is a fragmentary development view showing the ball raceways.

Fig. 6 is a side view of the cage.

Fig. 7 is a view similar to Fig. 5 showing a different raceway arrangement.

Figs. 8, 9, and 10 are schematic views of joints having different ball arrangements.

In the drawings, the numerals 10 and 11 indicate shafts connected by the improved joint for the transmission of rotary power. The male element of the joint comprises a truncated spherical head 12 splined on the end of the shaft 10 and disposed within a cylindrical casing 13 constituting the female joint element. Herein, the casing is mounted on the shaft 11 through the medium of a flange 14 integral with the shaft and having a cylindrical periphery 15 closely fitting into a bore 16 in one end of the casing. The bore is notched (see Fig. 4) to receive annularly spaced lugs 17 on the flange. The parts are held in this keyed relation by a snap ring 18 disposed in registering grooves in the flange 14 and the bore 16.

Equally spaced around the interior of the head 12 are a series of grooves 19 substantially semi-circular in cross-section and extending generally longitudinally of the head axis but inclined relative thereto, the angle being usually from five to nine degrees. In the joint shown in Figs. 1 to 5 and 7, the adjacent grooves are oppositely inclined and each is either straight, as shown, or helical, that is, extending at a constant distance from the shaft axis.

The defining walls of the grooves constitute the inner raceways for balls 20 each of which is seated in an outer raceway 21 defining a semi-circular groove in the internal surface 16 of the casing 13. These raceways are straight or helical depending on the contour of the inner raceways 19 and extend at the same angles relative to the joint axis. However, the inclination of each raceway 21 is opposite to that of the mating inner raceway 19 so that with the joint elements alined, the inner and outer raceways of each pair all cross each other at points which lie in a plane normal to the joint axis and at an included angle of twelve degrees in the present instance. The balls, being at the intersections of the pairs of raceways, are thus positioned by the raceways. Grooves 22 are formed along the roots of the raceways to insure proper rolling contact between the balls and their raceways.

To produce the constant velocity characteristic, the balls are maintained at all times in a common plane which bisects the angle included between the shaft axes. This is accomplished by a cage comprising a truncated spherical shell 23 having a loose sliding fit with the periphery 24 of the head 12 but spaced from the internal surfaces 25 and 26 of the casing 21. The former of these is an annular curved surface defined by an inturned flange 27 formed at the open end of the casing beyond the bore 16 for the purpose of holding the joint assembled. The surface 26 is concave and formed on the flanged end of the female joint element to clear the cage in all positions of the joint. The cage may be of one piece sheet metal construction split longitudinally and notched so that the ends interlock as indicated at 28. Spaced around the cage according to the spacing of the balls 20 are a plurality of oblong holes 29 which receive the balls and have a working fit with the latter axially of the joint. Since the cage is only intended to hold the balls in the bisecting plane, the holes are elongated circumferentially of the cage to afford clearance in this direction.

With the shafts 10 and 11 alined as shown, each pair of raceways will cross at the same angle and all of the balls will be held in a common plane by their raceways without the assistance of the cage. As the joint is flexed, however, the angle between certain of the mating raceways is reduced below the locking angle, usually about nine degrees, and the raceways may even become parallel at the larger shaft angles. The balls in such raceways are controlled by the cage and maintained in the bisecting plane. However, such balls remain active in transmitting torque.

The cage itself is positioned by those of the balls which, at any given shaft angle, are disposed in raceways intersecting at greater than the locking angle. To insure positive positioning, the cage should, under all conditions, be controlled by at least three balls and these should be well distributed angularly. I have discovered that with certain numbers of balls and raceway arrangements, alternation of the inclination of the raceways in each joint element as above described prevents positive control of the cage from being obtained. This will be apparent by analysis of a six ball joint as shown in Fig. 8 wherein the letters inside and outside of the dotted pitch circle of the balls indicate the alternating right and left hand inclination of the inner and outer raceways 19 and 21. Great circles have been drawn from ball 1 to ball 4 in full line to indicate the center line of an outer raceway of infinitesimal depth. A broken line, also a great circle, has been drawn between the same balls to indicate the center line of an inner raceway of infinitesimal depth. Likewise, similar great circles have been drawn from ball 6 to ball 3. The inner raceways cross the YY axis at A and the outer races cross at B.

Assume now that the outer joint element is fixed and that the inner element is moved about the XX axis which is equivalent to tipping the shaft 10 downwardly in a plane parallel to the YY axis and normal to the XX axis. Under such conditions, all points lying in the plane of the YY axis will continue to lie in this plane and point A will move down the YY axis and approach point B. When it reaches point B, the two great circles will coincide at three points and then are parallel throughout their entire lengths. From this it follows that a left hand outer race with a right hand inner race located in quadrants I and II becomes more and more parallel when the inner member is moved as above described and that a right hand outer race with a left hand inner race located in quadrants III and IV similarly becomes more parallel. By the same analysis, it will be seen that a right hand outer race coacting with a left hand inner race in quadrants III or IV becomes more parallel; whereas a left hand outer race becomes more obtuse to a right hand inner race in these quadrants. If with six balls, as shown in Fig. 8, the joint is flexed sufficiently as above described, the raceways for balls 1, 3, 4, and 6 will become parallel approximately simultaneously leaving the cage 23 free to swing about the XX axis on which the other balls 2 and 5 are disposed. Such a joint would be subject to locking and therefore would be useful only at joint angles below that at which any of the coacting raceways approach the locking angle. A six ball joint with raceways crossing at twelve degrees would operate properly only at angles somewhat less than ten degrees.

Based on the foregoing analysis, I have found that eight is the minimum practicable number of balls divisible by two which will produce dependable cage control in a joint having raceways of different inclinations to reduce end thrust. For this number of balls, the raceways would be arranged as shown by the reference letters R and L in Fig. 9. Assuming, as before, that the inner joint member is flexed about in a plane normal to the XX axis and following the rules mentioned above, the raceways for balls 2, 4, and 7 will be disposed at less than the locking angle when the inner joint element is flexed ten degrees relative to the outer element. At this time, balls 1, 3, 5, 6, and 8 are in raceways intersecting at greater than a locking angle so that the cage will be held in the desired position and at the correct angle, and the joint is operative because of the wide distribution of the cage controlling balls. Also, it should be noted that the raceways for ball 3 become parallel and cross at the opposite angle before the raceways of balls 2 and 4 become parallel which further improves the control of the cage. At larger joint angles, an even more satisfactory distribution of the cage controlling balls obtains.

An equally favorable distribution of the balls that control the cage at various joint angles may be obtained with eight balls and with the raceways for these inclined as shown in Figs. 7 and 10. Instead of the adjacent raceways 19 and 21 in each member being inclined reversely, as in the arrangement previously described and shown in Fig. 9, the successive raceways are arranged in pairs with the raceways of each pair having the same inclination and those of adjacent pairs being of opposite inclination. Thus, balls 1, 2, 5, and 6 would have outer right and inner left hand raceways and balls 3, 4, 7, and 8 would have outer left hand and inner right hand raceways. Considering, as before, the joint angle at which any of the coacting raceways reach parallelism, we find that, under such a condition, the raceways of balls 2 and 6 would approach parallelism while balls 1 and 5 are located in raceways whose angle has changed only slightly, and balls 3, 4, and 8 are located in obtusely crossing raceways. Balls 1, 3, 4, 5, and 8 thus provide for effective control of the cage which is positioned equally well at all other joint angles.

While greater or less numbers of balls with raceways alternating as above described may be employed in a universal joint of the above character without danger of locking, due to improper control of the cage, at large shaft angles, it is desirable from the standpoint of transmitting a maximum torque for a given overall joint dimension to employ eight balls as above described. A ten ball joint of the same construction would have a capacity only eighty-three per cent as great as the joints above described, and the capacity of a twelve ball joint would be reduced to approximately sixty-eight per cent. In a four ball joint of the same type, only two balls control the cage at certain angles and only three of such balls are effective in transmitting torque at large shaft displacement angles and, in addition, the advantage of alternating the raceways to balance the end thrust is sacrificed. It follows that the joint constructed in accordance with the present invention possesses a maximum torque transmitting capacity for a given joint size and with the ball raceways arranged to provide for balancing of the end thrusts as well as adequate and positive control of the cage at all operating angles.

This application is a continuation in part of my copending application Serial No. 368,119, filed December 2, 1940.

I claim as my invention:

1. In a constant velocity universal joint, the combination of male and female rotary elements providing an even number of pairs of ball raceways equally spaced circumferentially and extending in a generally axial direction with the raceways of each pair crossing each other and with each raceway inclined opposite to that of at least one of the next adjacent raceways in the same element, a ball located at the crossing of each pair of raceways, and a cage embracing said balls and confining the same in a plane that is movable about the point of intersection of the axes of said elements, there being exactly eight of said balls and pairs of raceways.

2. In a constant velocity universal joint, the combination of male and female rotary elements providing an even number of pairs of ball raceways equally spaced circumferentially and extending in a generally axial direction with the raceways of each pair crossing each other and respectively formed on the male and female elements, the raceways on each element being arranged in a succession of pairs annularly spaced around the joint and with the raceways of each of said last mentioned pairs having the same inclination and the raceways of adjacent pairs having opposite inclination, a ball located at the crossing of each pair of raceways, and a cage embracing said balls and confining the same in a plane that is movable about the point of intersection of the axes of said elements.

3. In a constant velocity universal joint, the combination of male and female rotary elements providing an even number of pairs of ball raceways uniformly spaced circumferentially and extending in a generally axial direction with the raceways of each pair crossing each other and with each raceway on either element inclined opposite to that of the next adjacent raceway on the same element, a ball located at the crossing of each pair of raceways, and a cage embracing said balls and confining the same in a plane that is movable about the point of intersection of the axes of said elements, there being exactly eight of said balls and pairs of raceways whereby to obtain optimum torque transmitting capacity while at the same time insuring positive positioning of said cage at included joint angles beyond which certain of the coacting raceways become parallel.

ADIEL Y. DODGE.